United States Patent [19]
Rioland et al.

[11] Patent Number: 6,040,566
[45] Date of Patent: Mar. 21, 2000

[54] DEVICE TO CONTROL THE AIMING AND FOCUSING OF LASER SYSTEMS ON A TARGET

[75] Inventors: Jacques Rioland, Eaubonne; Paul Thibout, Guyancourt; Patrice Jano, Seine Port, all of France

[73] Assignee: Thomson-CSF, Paris, France

[21] Appl. No.: 09/009,180

[22] Filed: Jan. 20, 1998

[30] Foreign Application Priority Data

Jan. 31, 1997 [FR] France .................................... 97 01072

[51] Int. Cl.$^7$ ........................................ G11B 7/09
[52] U.S. Cl. ................. 250/201.9; 356/363; 356/121
[58] Field of Search ........................... 250/201.9, 201.8, 250/203.2; 356/121, 363

[56] References Cited

U.S. PATENT DOCUMENTS

| | | | |
|---|---|---|---|
| 3,304,523 | 2/1967 | Jaouen et al. | 335/210 |
| 3,660,658 | 5/1972 | Leboutet et al. | 250/398 |
| 4,141,652 | 2/1979 | Feinleib | 356/121 |
| 4,725,138 | 2/1988 | Wirth et al. | 356/121 |
| 4,744,658 | 5/1988 | Holly | 356/351 |
| 5,072,135 | 12/1991 | Huignard et al. | 359/327 |
| 5,173,910 | 12/1992 | Pocholle et al. | 372/22 |
| 5,259,567 | 11/1993 | Jano et al. | 244/3.11 |
| 5,410,397 | 4/1995 | Toeppen | 356/121 |
| 5,490,643 | 2/1996 | Jano et al. | 244/3.11 |

OTHER PUBLICATIONS

Patent Abstracts of Japan, vol. 13, No. 359, (E–804), Aug. 10, 1989 and JP 01 119081 A, May 11, 1989.

Geun Young Yoon, et al., "Measurement of Laser Wavefront Using Shack Hartmann Method With New Lens Array", Technology Reports of the Osaka University, vol. 45, No. 2208, Apr. 15, 1995, pp. 27–33.

"Nova Integrated Alignment/Diagnostic Sensors, Final Technical Report", Lawrence Livermore Laboratory–UCRL 13811, Livermore, CA, USA, Jan. 18, 1978, pp. 1–9.

P.F. Cunningham, et al, "Plasma Evolution In Laser–Irradiated Cylindrical Cavities", Optics Communications, vol. 68, No. 6, Nov. 15, 1988, pp. 412–417.

I. Liberman, et al., "Automatic Target Alignment of the Helios Laser System", Applied Optics, vol. 19, No. 9, May 1, 1980, pp. 1463–1467.

Robert F. Benjamin, et al., "Direct Measurement of the Accuracy of $CO_2$ Laser Alignment on Target", Applied Optics, vol. 17, No. 23, Dec. 1, 1978, pp. 3809–3811.

*Primary Examiner*—Edward P. Westin
*Assistant Examiner*—Thanh X. Luu
*Attorney, Agent, or Firm*—Oblon, Spivak, McClelland, Maier & Neustadt, P.C.

[57] ABSTRACT

A device to control the aiming and focusing of laser systems on a target comprises at least one reflecting false target (21) positioned and oriented substantially identically to the target (3), a lens (12) for the focusing of the beam on this false target, a separator device (11), a wavefront analyzer (35), a mirror (33) and a semi-reflective plate (32), the beam (1) getting focused, at the end of the system, on the false target (21) after getting reflected on the separator device (11). A part (31) of the beam with the same wavelength as that of the part reflected by the separator device (11) goes through this device and the semi-reflective plate (32) to get directed towards the wavefront analyzer (35). The beam reflected by the false target (21) goes through the separator grating (11) to get reflected on the mirror (33) and the semi-reflective plate (32) to get directed towards the wavefront analyzer (35). The aiming and focusing measurements are carried out by means of this wavefront analyzer (35) through a differential analysis between the two wavefronts. Application especially to power lasers.

9 Claims, 3 Drawing Sheets

DEVICE TO CONTROL THE AIMING AND FOCUSING OF LASER SYSTEMS ON A TARGET

BACKGROUND OF THE INVENTION

The present invention relates to a device to control the aiming and focusing of laser systems on a target. It can be applied especially in the field of power lasers used for example to study the physics of thermonuclear plasmas. Plasmas of this kind are obtained by focusing laser beams on the periphery of a target positioned for example within a capsule located in a cavity in which a high vacuum is present.

Several beams have to be focused on a target to obtain the energy to trigger a nuclear fusion reaction. The number of beams may for example exceed 200. A beam coming from a medium powered driving laser, generally a neodymium/glass laser with a wavelength equal to 1.054 $\mu$m giving energy of the order of 1 joule, is amplified by means of optical amplifiers placed in a multiple-passage amplification system. This beam is then transmitted to non-linear crystals used to obtain an ultraviolet output beam with a wavelength equal to 0.351 $\mu$m whose energy may go up to several kilojoules. The entire set of beams may then provide the target with energy equivalent to several hundreds of kilojoules.

There may be two types of targets. A first type of target consisting of a microbead with a diameter of 1 mm is engaged directly. A second type of target is engaged indirectly. In this case the preceding microbead is located within a cylinder with a diameter for example of 1 cm. In the former case, it is necessary to focus the beams on a precise point of the bead, at the center, on the surface or elsewhere. In the latter case, the beams must be focused on the circular apertures made in the bases of the cylinder. In both cases, the beams must therefore converge at a precise point. This requirement means that it is necessary to ensure transversal settings in the x, y directions and longitudinal setting in the z direction.

The aiming and focusing of the beams on the target must be done with 3D precision, for example of the order of 50 $\mu$m, it being possible for the target to be positioned, depending on the firing operation, in a spherical domain with a radius of 5 mm.

The aim of the invention is to enable a precise setting of the aiming and focusing of the laser system on a target of the first or second type.

SUMMARY OF THE INVENTION

To this end, an object of the invention is a device for the aiming and focusing of a laser beam on a target through a transport system, wherein said aiming and focusing device comprises at least one reflecting false target positioned and oriented substantially identically to the target, a lens for the focusing of the beam on this false target, a separator device, a wavefront analyzer, a mirror and a semi-reflective plate, the beam getting focused, at the end of the system, on the false target after getting reflected on the separator device, a part of the beam with the same wavelength as that of the part reflected by the separator device going through this device and the semi-reflective plate to direct a first wavefront towards the wavefront analyzer, the beam reflected by the false target going through the separator grating to get reflected on the mirror and the semi-reflective plate to direct a second wavefront towards the wavefront analyzer, the aiming and focusing measurements being obtained by means of this wavefront analyzer through a differential analysis between the two wavefronts.

The main advantages of the invention are that it is simple to implement, requires few elements, enables easy and fast setting and is economical.

BRIEF DESCRIPTION OF THE DRAWINGS

Other features and advantages of the invention small appear from the following description, made with reference to the appended drawings, of which.

MORE DETAILED DESCRIPTION

Figure 1:
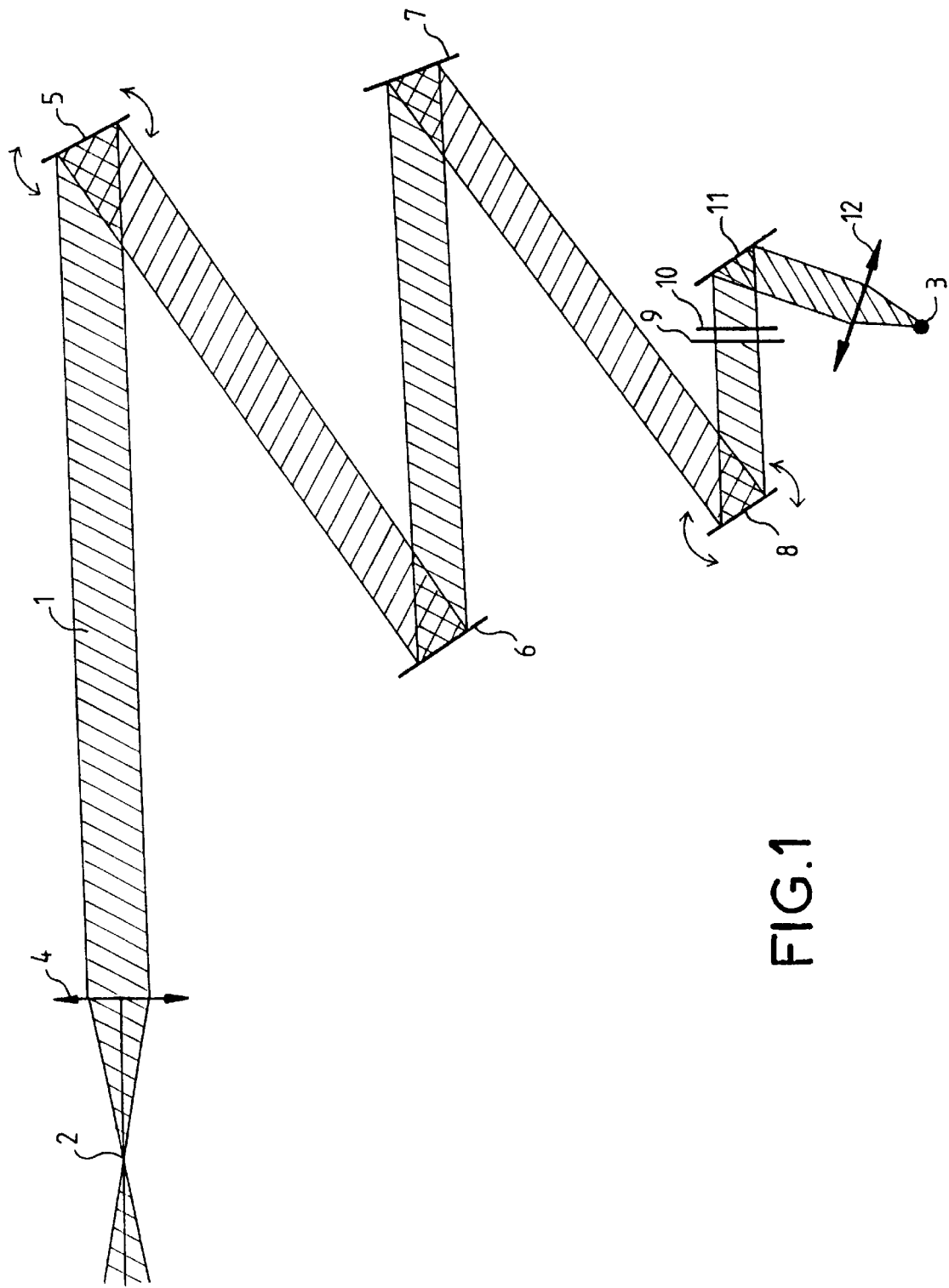
FIG. 1 shows an exemplary embodiment of a system for the transportation of a laser beam from the output of its amplification line up to its target.

FIG. 1 shows an example of the path of an amplified laser beam 1 between its exit from its amplification system, represented for example by a focusing point 2, and a target or capsule 3, for example a capsule containing a mixture of deuterium and tritium. To initiate a nuclear fusion reaction, a large number of beams such as the beam 1 of FIG. 1 get focused on this capsule 3. The exit of the amplification system 2 is followed by a lens 4 which makes the laser beam 1 parallel. This beam then gets reflected on several mirrors 5, 6, 7, 8 and then crosses for example two non-linear crystals 9, 10 so that it passes from the infrared region to the ultraviolet region, namely for example from a wavelength of 1.053 $\mu$m to a wavelength of 0.351 $\mu$m. At output from the non-linear crystals, the laser beam 1 gets reflected for example on a mirror 11 before reaching a second lens 12 that focuses it on the target 3. The mirror 11 may also be a grating working in reflection or transmission mode. It may also be identical with the lens 12 in the case of a focusing grating.

The energy of the laser beam focused on this target 3 may go for example up to several kilojoules. The aiming and focusing on the target 3 should be done for example with a 3D precision of 50 $\mu$m. The target should be capable of being positioned, depending on the firing operation, in a spherical domain with a radius of 5 mm. The setting of the beam 1 on the target 3 generally needs to be done, especially before each firing operation, for example because of numerous causes of losses of adjustment such as the shifting of various optical systems or non-linear effects.

Figure 2:
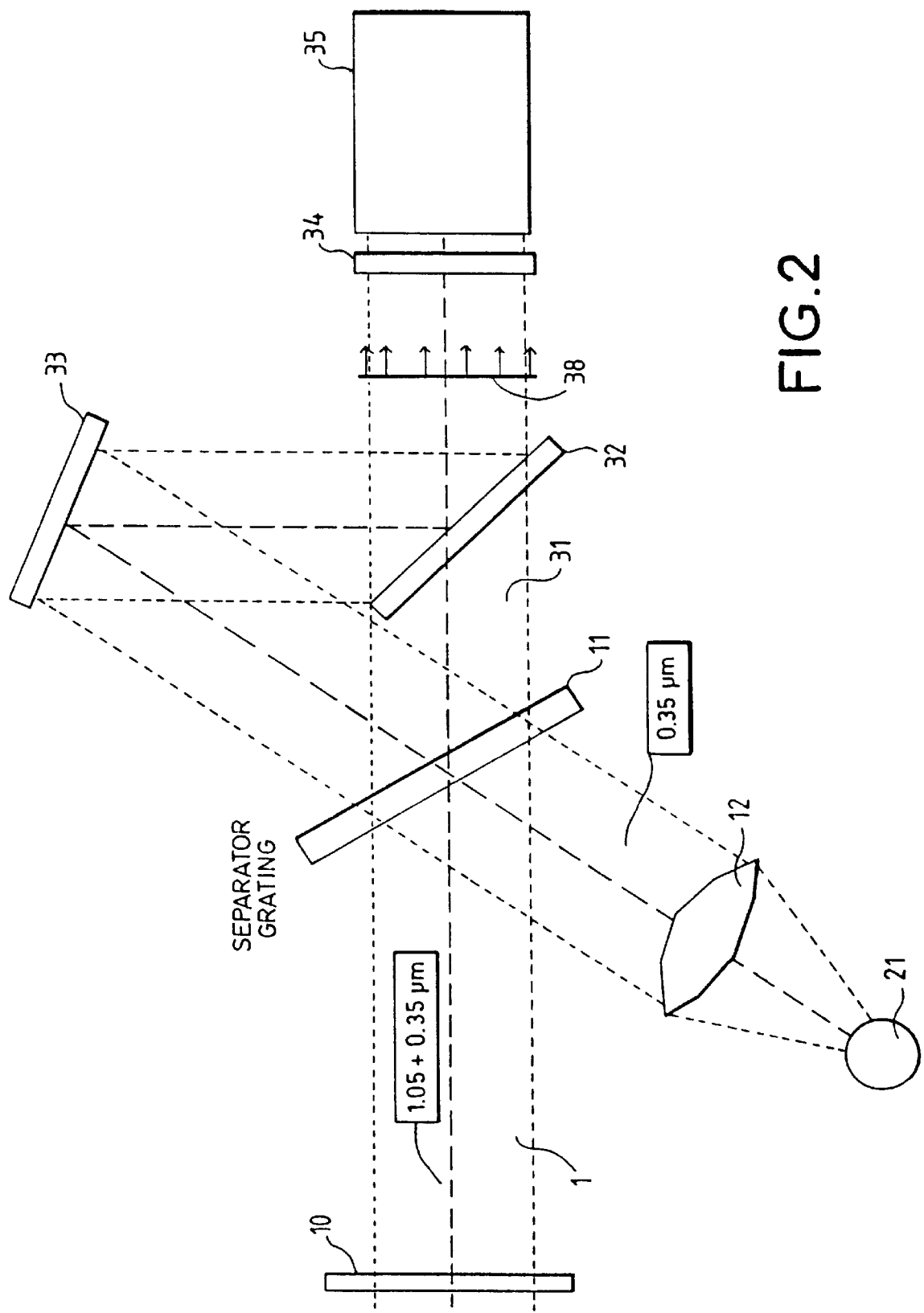
FIG. 2 shows a possible exemplary embodiment of a device according to the invention.

FIG. 2 shows an exemplary possible embodiment of a device according to the invention used to obtain the aiming and focusing of a laser beam on a target. This figure furthermore includes some of the last elements of FIG. 1 encountered on the path of the laser beam 1, namely the second non-linear crystal 10 and the focusing lens 12. The mirror 11 is replaced by a separator device, for example a diffractive grating or a dichroic plate. The target 3 can be replaced by a reflecting false target 21. The beam may for example be smooth.

FIG. 2 shows that a diffractive grating or a dichroic plate 11 placed downline from the second non-linear crystal 10 reflects the part of the beam, transmitted by the non-linear crystals 9, 10 and having a wavelength of 0.35 $\mu$m, towards the focusing lens 12 and the false target 21. The device according to the invention advantageously uses the transmission losses 31 from this separator device 11. The device according to the invention has a first semi-reflective mirror 32, a mirror 33, a filter 34, a wavefront analyzer 35, the focusing lens 12 and the reflecting false target 21 positioned and oriented identically to the target within specific tolerances, for example by means of two cameras with orthogonal axes of aim.

Figure 3A:
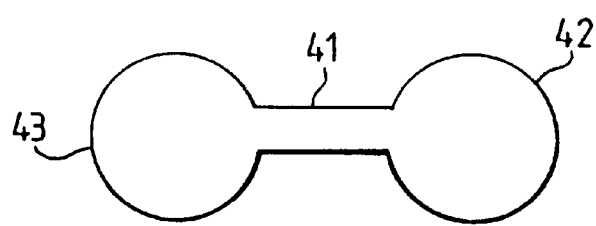
FIGS. 3a and 3b show possible exemplary embodiments of false targets for indirect engaging.
Figure 3B:
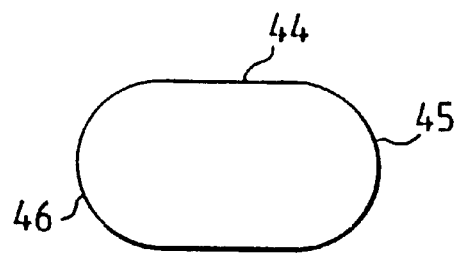

The false target 21 is constituted for example by a reflective bead with a diameter greater than that of the real target, for example a diameter of 10 mm, the center of which is placed for example at the center of the microbead in the case of a setting for direct engagement or at the center of one of the bases of the cylinder in the case of an indirect engagement. In the latter case, the bead is for example then placed at the center of the other base to adjust the convergent beams towards this second base. This mobile bead may also be replaced by a cylinder 41 provided at its ends with two spheres 42, 43 as shown in FIG. 3a. This bead may again for example be replaced by a cylinder 44 provided at its ends with two hemispheres 44, 45 as shown in FIG. 3b. More generally, the false target is constituted for example by one or more reflective spherical surfaces centered on specified focusing points, positioned and oriented identically to the real target, for example by means of two cameras with orthogonal aiming axes.

The beam reflected by the false reflective target goes through the separator device 11 and gets reflected on the mirror 33 and then on the mirror 32 in order to be directed towards the wavefront analyzer 35 through the filter 34 to be analyzed by this analyzer. The beam 31 transmitted through the separator device 11 goes through the semi-reflective mirror to reach the filter 34 which transmits only the ultraviolet wavelength, namely the 0.35 μm wavelength. The beam is then transmitted to the wavefront analyzer 35.

The mean wavefront 38, which gets propagated from the non-linear crystal 10 and is identical to the wavefront incident to the false target, is almost planar. In the event of precise aiming and focusing on the reflective false target 21, the mean return wavefront too must be almost planar and in particular, it must be merged with the incident front. If this is not the case, the aiming and the focusing are not ensured. A loss of aim or defocusing is characterized in particular by an asymmetrical or symmetrical deformation of the incident wavefront.

The beam is aimed at and focused on the reflective false target 21 by the use of the wavefront analyzer 35. The aiming and focusing measurements are achieved by a differential analysis of the wavefronts incident to and reflected by the false target. This is an analysis done on the basis of the wavefront incident to the false target. Since the incident front is substantially planar, accurate aiming and focusing will be characterized by equality between the incident and reflected fronts. The laser pulse has for example a total length of 20 ms with a peak of 3 ms. On the wavefront analyzer, the outgoing and incoming pulses are separated for example by a period of time corresponding to the difference in paths travelled between their entry into the device and their exit therefrom. For the direct wave d(11 to 32)/c and for the analysis wave:

[d(11 to 12)+d(12 to 21)+(21 to 12)+d(12 to 11)+d(11 to 33)+d(33 to 32)]/c c being the velocity of light, and d(i to j) representing the distance between an element referenced i and an element referenced j in FIG. 2. Given the distances d, the two waves are therefore not present simultaneously on the analyzer 35.

The transversal positioning of the beams on the false target, namely the aiming, and the longitudinal 3 positioning on the false target, namely the focusing, are done for example by the analysis of the differential imprint of the incident beam and the reflected beam on the wavefront analyzer. The wavefront analyzer in fact enables the analysis of the outgoing and incoming wavefronts. An analyzer of this kind, such as the Hartmann analyzer for example, known to those skilled in the art, has holes or microlenses located in one and the same plane. These microlenses focus the beam reflected by the false target 23 at several points of convergence in such a way that, if this front is planar, the points of convergence are all equidistant to one another. If the reflected front is not planar, the points of convergence are not equidistant.

The aiming is corrected as a function of the analysis of the wavefront performed, for example, by the Hartmann analyzer, in bringing into play for example the position or orientation of the mirrors 5 to 8 positioned in the transport system 4, 5, 6, 7, 8, 9, 10, 11, 12 of the beam from the exit 2 of the amplifier system. The focusing is corrected by the adjustment, for example, of the lens 12 for focusing the beam on the false target 21.

A device according to the invention enables the precise and automatic setting of the aiming and focusing of a laser system on a target. It is simple to implement and requires but few elements. It furthermore enables the easy and speedy setting of all the systems simultaneously. In order to improve the aim and focusing, the wavefront analyzer of the device may also be connected to means to guide a wavefront corrector implanted in the amplifier system.

The wavefront analyzer can be used to hold the aiming of the transport system once the false target 21 is replaced by the true target 3 by analyzing the development of the incident wavefront. Finally, the wavefront analyzer enables the measurement of the nominal flux of the incident wavefront in amplitude and in phase in order to optimize smoothing, amplification and tripling and makes it possible to take account of variations of alignment when the amplifiers of the amplifier system are in operation.

The laser beam 1 used by the device according to the invention is for example at the real wavelength of use, for example 350 nm, coming from an amplifier system working at low energy or from an ancillary source.

What is claimed is:

1. A device for aiming and focusing a laser beam on a target, said device comprising:

at least one reflecting false target positioned and oriented substantially identically to a target to be impinged by a laser beam;

a separator device configured to receive the laser beam, transmit a first portion of the laser beam having a first wavefront, and reflect a second portion of the laser beam having a second wavefront, said first wavefront and said second wavefront having substantially the same wavelength;

a lens configured to receive the second portion of the laser beam reflected by the separator device and to focus the second portion of the laser beam on the reflecting false target;

a first mirror configured to receive the second portion of the laser beam reflected off of the reflecting false target and to reflect the second portion of the laser beam;

a second mirror configured to receive the second portion of the laser beam reflected off of the first mirror, reflect the second portion of the laser beam, receive the first portion of the laser beam transmitted by the separator device, and transmit the first portion of the laser beam, said second mirror being a semi-reflective mirror; and a wavefront analyzer configured to receive the first portion of the laser beam transmitted by the separator device, receive the second portion of the laser beam reflected by the second mirror, and make aiming and focusing measurements for the laser beam by performing a differential analysis of the first wavefront and the second wavefront.

2. A device according to claim 1, wherein the wavefront analyzer comprises:

a Hartmann analyzer.

3. A device according to claim 1, wherein the transversal and longitudinal positioning of the laser beam on the false target is measured by analyzing the differential imprint of the first and second portions of the laser beam on the wavefront analyzer.

4. A device according to claim 1, wherein the wavelength of the laser beam when the laser beam is reflected off of the reflecting false target is the same as the wavelength of the laser beam when the laser beam is to impinge the target.

5. A device according to claim 1, wherein the false target comprises:

one or more reflective spherical surfaces, centered on specified focusing points positioned and oriented identically to the real target.

6. A device according to claim 5, wherein the false target comprises:

a cylinder having two ends and a sphere on each of the two ends.

7. A device according to claim 5, wherein the false target comprises:

a cylinder having two ends and a hemisphere on each of the two ends.

8. A device according to claim 1, wherein the wavefront analyzer is connected to means for driving a wavefront corrector implanted in the system.

9. A device for aiming and focusing a laser beam on a target, said device comprising:

at least one reflecting false target positioned and oriented substantially identically to a target to be impinged by a laser beam;

separator means for receiving the laser beam, transmitting a first portion of the laser beam having a first wavefront, and reflecting a second portion of the laser beam having a second wavefront, said first wavefront and said second wavefront having substantially the same wavelength;

lens means for receiving the second portion of the laser beam reflected by the separator means and for focusing the second portion of the laser beam on the reflecting false target;

first mirror means for receiving the second portion of the laser beam reflected off of the reflecting false target and for reflecting the second portion of the laser beam;

second mirror means for receiving the second portion of the laser beam reflected off of the first mirror means, reflecting the second portion of the laser beam, receiving the first portion of the laser beam transmitted by the separator means, and transmitting the first portion of the laser beam; and wavefront analyzer means for receiving the first portion of the laser beam transmitted by the second mirror means, receiving the second portion of the laser beam reflected by the second mirror means, and making aiming and focusing measurements for the laser beam by performing a differential analysis of the first wavefront and the second wavefront.

* * * * *